(12) United States Patent
Kieselbach

(10) Patent No.: US 7,316,776 B2
(45) Date of Patent: Jan. 8, 2008

(54) AQUARIUM FILTRATION SYSTEM WITH BIO-REACTOR

(76) Inventor: Eric Kieselbach, 37 King Eider La., Aliso Viejo, CA (US) 92656

( * ) Notice: Subject to any disclaimer, the term of this patent is extended or adjusted under 35 U.S.C. 154(b) by 153 days.

(21) Appl. No.: 11/042,283

(22) Filed: Jan. 24, 2005

(65) Prior Publication Data

US 2006/0163131 A1    Jul. 27, 2006

(51) Int. Cl.
*A01K 63/04*     (2006.01)
*C02F 3/06*       (2006.01)

(52) U.S. Cl. ............... 210/167.22; 210/167.26; 210/167.27; 210/259; 210/416.2; 210/905; 119/260; 119/261

(58) Field of Classification Search ........... 210/169, 210/232, 167.21, 167.22, 167.26, 167.27, 210/221.2, 905, 259, 416.1, 416.2, 150, 151; 119/259, 260, 261
See application file for complete search history.

(56) References Cited

U.S. PATENT DOCUMENTS

| | | | | |
|---|---|---|---|---|
| 5,084,164 A | * | 1/1992 | Del Rosario | 210/94 |
| 5,217,616 A | * | 6/1993 | Sanyal et al. | 210/617 |
| 5,554,280 A | * | 9/1996 | Loehr | 210/169 |
| 5,618,413 A | * | 4/1997 | Todd et al. | 210/151 |
| 5,618,431 A | * | 4/1997 | Kondo et al. | 210/618 |
| 5,628,905 A | * | 5/1997 | Montalbano | 210/615 |
| 5,667,671 A | * | 9/1997 | Munsch et al. | 210/151 |
| 5,910,248 A | * | 6/1999 | Tlok | 210/608 |
| 6,524,849 B1 | * | 2/2003 | Adams et al. | 435/299.1 |
| 6,869,530 B1 | * | 3/2005 | Venezia | 210/221.2 |

FOREIGN PATENT DOCUMENTS

JP    8-108191    * 4/1996
KR    404688 B    * 11/2003

* cited by examiner

*Primary Examiner*—Fred G. Prince
(74) *Attorney, Agent, or Firm*—Russo & Duckworth, LLP

(57) ABSTRACT

An improved aquarium filtration system is provided which includes a bio-reactor chamber. The bio-reactor chamber includes a plurality of bio-balls which have a high surface area for collecting bacteria for biological filtration. The bio-reactor includes one or more pumps for pumping both water and air into the bio-reactor chamber. Preferably, the oxygenated water creates protein laden foam and the bio-reactor chamber includes a removable protein collector. To this end, the bio-reactor chamber includes a vertical column for carrying the protein laden foam into the removable collector.

4 Claims, 4 Drawing Sheets

AQUARIUM FILTRATION SYSTEM WITH BIO-REACTOR

BACKGROUND OF THE INVENTION

The present invention relates to improved apparatus and methods for maintaining the purity of water used in aquariums. More particularly, the present invention relates to improved filtration systems for filtering unwanted toxic compounds from fresh water and salt water aquariums.

A main object of aquarium maintenance is to maintain the aquatic life in a healthy state which typically requires that the aquarium environment be maintained at a level approximating that outside of captivity. Unfortunately, within a closed loop aquarium system, various unhealthy, as well as toxic compounds are created during the life cycle process. These compounds include dissolved proteinaceous elements which form as a result of various sources including leftover food, aquatic life wastes and decaying plants and animals. These unwanted compounds are then broken down by environmental bacteria and converted into nitrates and nitrites. All of these latter compounds, including ammonia, nitrates and nitrites, eventually reach levels which will destroy the aquatic life within the aquarium unless steps are taken to control their levels.

To deal with the problem of toxic waste build-up, several types of filtration systems have been utilized. One approach is to utilize physical filtration wherein the suspended toxic materials are physically trapped by mechanical filters. These mechanical filters typically use gravel, glass, diatomaceous earth and the like to control the level of debris and waste materials in the aquarium water. More recently, filtration material has included fluffy structures of synthetic resin fibers.

An additional known type of filtration for aquariums utilizes chemical filtration to remove or deactivate mostly organic toxic compounds. These chemical filtration systems typically use activated carbon and ion exchange resins which bind to unwanted toxins.

Still an additional type of aquarium filtration utilizes biological filtration. These biological filtration systems utilize living organisms, primarily bacteria, to rid the tank of toxic ammonia. The biological filters typically include spherical elements, typically referred to as bio-balls for growing bacteria. As used herein, the term "bio-ball" is intended to be used in its broadest sense to encompass any physical structure having a high surface area for the accumulation of bacteria for biological filtration.

Still an additional aquarium filtration technique uses protein skimmers which control the level of toxic compounds in aquarium water by the technique of foam removal of dissolved protein compounds. For example, U.S. Pat. No. 3,965,007 naming Conn et al. as the inventor discloses such a system. Typically, a protein skimmer includes a central chamber having an inlet for the introduction of oxygenated water and an outlet primarily for the release of water. In addition, the protein skimmer includes a vertical column for the communication of protein laden foam and a foam collection container located at the top of the vertical column. In operation, foam is created within the chamber due to the oxygenation of the water which travels up the vertical column to be collected within the foam collection container. Typically, the foam collection container is removable to facilitate cleaning.

Various aquarium filtration systems have combined the biological, mechanical and chemical adsorption elements into self contained external and internal units. For example, U.S. Pat. Nos. 3,957,634; 5,234,581 and 5,554,280 describe a variety of units including biological, mechanical and chemical filtration elements. Unfortunately, even these multiple filtration technique units suffer from various drawbacks. For example, most of these systems require significant maintenance including the removal and replacement of filter medium. Moreover, prior art filtration systems are typically inefficient requiring that the aquarium be constantly supervised and maintained.

Thus, it is an object of the present invention to provide a more efficient mechanical/chemical/biological filter system to remove toxic compounds from aquarium water.

It is another object of the invention to provide an improved filtration system which requires less maintenance by aquarium operators.

It is still an additional object of the invention to provide an improved aquarium filtration system which is constructed in a simple one-piece unit which can be attached within the aquarium or on the outside of the aquarium housing.

Additional objects, features and advantages of the present invention will be apparent from the following written description which follows.

SUMMARY OF THE INVENTION

Briefly, the aquarium filtration system of the present invention includes a housing which is preferably formed from a translucent plastic material. The housing includes an inlet for introduction of aquarium water to be filtered and an outlet for returning the filtered water to the aquarium. The housing further includes one or more internal chambers where aquarium filtration takes place.

It is a primary aspect of the present invention that the aquarium filtration system include a bio-reactor chamber. To this end, the aquarium filtration system's housing includes a chamber dedicated to bio-reactor activity. The bio-reactor chamber includes a plurality of bio-balls which are preferably spherical and have a high surface area for the collection of bacteria for biological filtration. In addition, the bio-reactor chamber includes an inlet for the introduction of oxygenated water and an outlet for the release of filtered water. In a preferred embodiment, the bio-reactor chamber is constructed to include a protein skimmer. To this end, the bio-reactor chamber includes a substantially vertical column and a foam collection container.

The aquarium filtration system of the present invention further includes a pumping system, which is preferably constructed as a simple venturi pump. The pumping system communicates pre-filtered water through the system housing and through the bio-reactor chamber. In addition, the pumping system collects air from outside of the housing for oxygenating the water introduced into the bio-reactor chamber. This pumping system provides both water and air bubbles directly into the bio-reactor chamber. The introduction of air into the chamber oxygenates the water which enhances the microbial activity upon the bio-balls, thereby providing improved biological filtration. In addition, the introduction of the air bubbles into the bio-reactor chamber create a foam at the top of the chamber which is forced upwardly through the vertical column. This foam collects unwanted proteins which are then collected within the foam collection container, in similar manner to as a protein skimmer.

In addition to a bio-reactor chamber, the aquarium filtration system may include one or more additional chambers for providing additional biological, mechanical or chemical filtration. In a preferred embodiment, the aquarium filtration system further includes an anaerobic filter chamber. The anaerobic filter chamber includes a filtration medium as can be selected by those skilled in the art. A suitable filtration material includes ceramic nodules.

In still an additional preferred embodiment, the aquarium filtration system of the present invention includes a chemical filter chamber. Again, various chemical filtration systems may be employed. However, in a preferred embodiment the chemical filter includes activated carbon. In addition to the anaerobic filter and chemical filter, preferably the aquarium filtration system includes one or more pads of synthetic resin fibers for trapping large particulates.

The filtration system's housing may be located within the aquarium, adjacent to the aquarium or some distance from the aquarium. However, in a preferred embodiment the aquarium housing includes latterly extending arms which are sized and positioned to rest on top of the aquarium sidewalls.

DETAILED DESCRIPTION OF THE INVENTION

Figure 1:
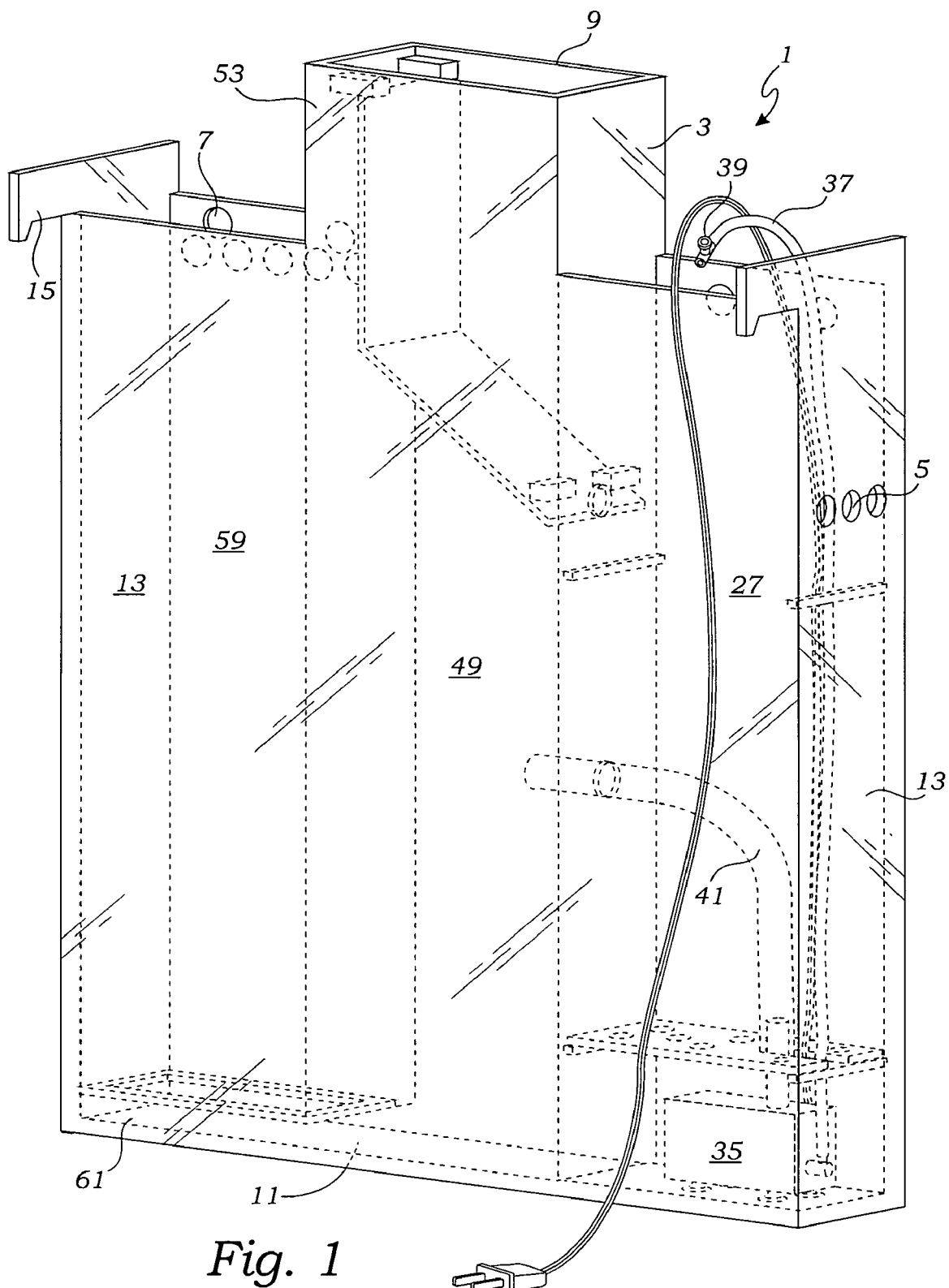
FIG. 1 is a perspective view illustrating a housing for the aquarium filtration system of the present invention.
Figure 2:
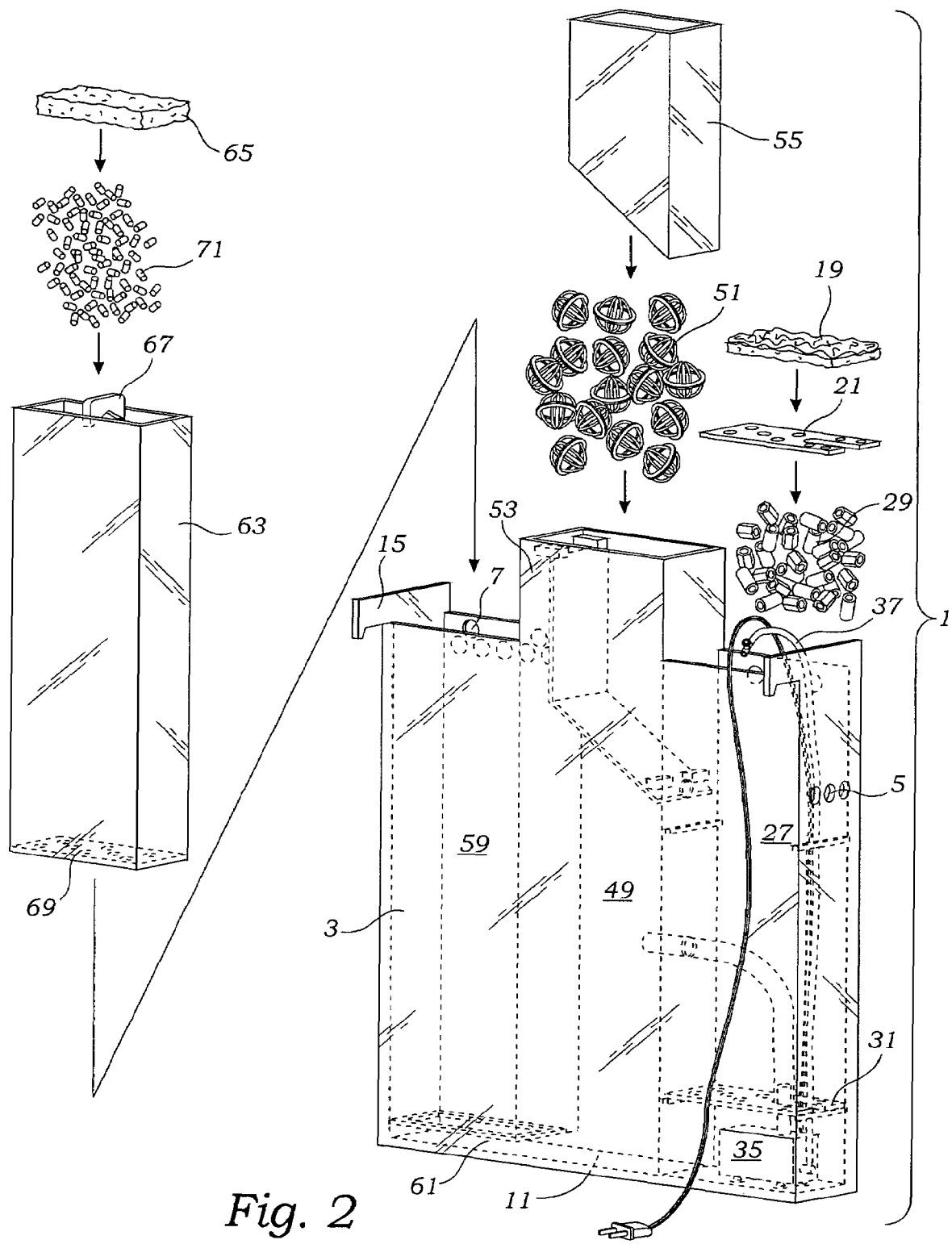
FIG. 2 is an exploded perspective view illustrating an aquarium filtration system of the present invention.

While the present invention is susceptible of embodiment in various forms, as shown in the drawings, hereinafter will be described the presently preferred embodiments of the invention with the understanding that the present disclosure is to be considered as an exemplification of the invention, and it is not intended to limit the invention to the specific embodiments illustrated.

With reference to FIGS. 1-4, the aquarium filtration system 1 is preferably constructed to be positioned within the interior of an aquarium (not shown) with a majority of the aquarium filtration system being positioned below the aquarium waterline. To this end, the aquarium filtration system 1 includes a housing 3 and a pair of laterally extending arms 15 which are sized to rest upon the aquarium's sidewalls. The housing 3 includes a top 9, a bottom 11, and a plurality of sidewalls 13 for encasing one or more filtration chambers. The housing also includes an inlet 5 for receipt of aquarium water and an outlet 7 for releasing the filtered water back into the aquarium environment. The housing may be constructed of any materials as can be selected by those skilled in the art such as plastic, glass or metals. However, in a preferred embodiment the housing is constructed of a translucent or semi-translucent durable plastic such as polycarbonate or acrylic.

It is a primary aspect of the present invention that the aquarium filtration system include at least one bio-reactor chamber 49. The bio-reactor chamber includes a plurality of bio-balls 51 which can be selected by those skilled in the art. The bio-balls 51 are typically constructed of plastic and include high surface areas for the collection of bacteria for biological filtration. The prior art constructions pumped pre-filtered or partially pre-filtered water into the bio-ball chambers. However, the present invention incorporates a construction wherein a combination of both water and air are pumped directly into the bio-reactor chamber. To this end, the aquarium filtration system includes one or more pumps 35 for pumping both water and air into the bio-reactor chamber. As shown in the figures, preferably the aquarium filtration system 1 includes a venturi pump 35 which is capable of pumping both air and water through a hose 41 into the bio-reactor chamber. The venturi pump includes a water inlet 38 (shown in FIG. 4) and an air inlet 37 in the form of a hose which travels through the filtration system's housing 3 so that its distal extremity extends above the waterline. In a preferred embodiment, the pump 35 includes a valve 39 for controlling the amount of air which enters the bio-reactor chamber. Advantageously, the bio-reactor chamber, which incorporates bio-balls and the introduction of both air and water, provides improved water filtration capabilities compared to prior art systems.

Figure 3:
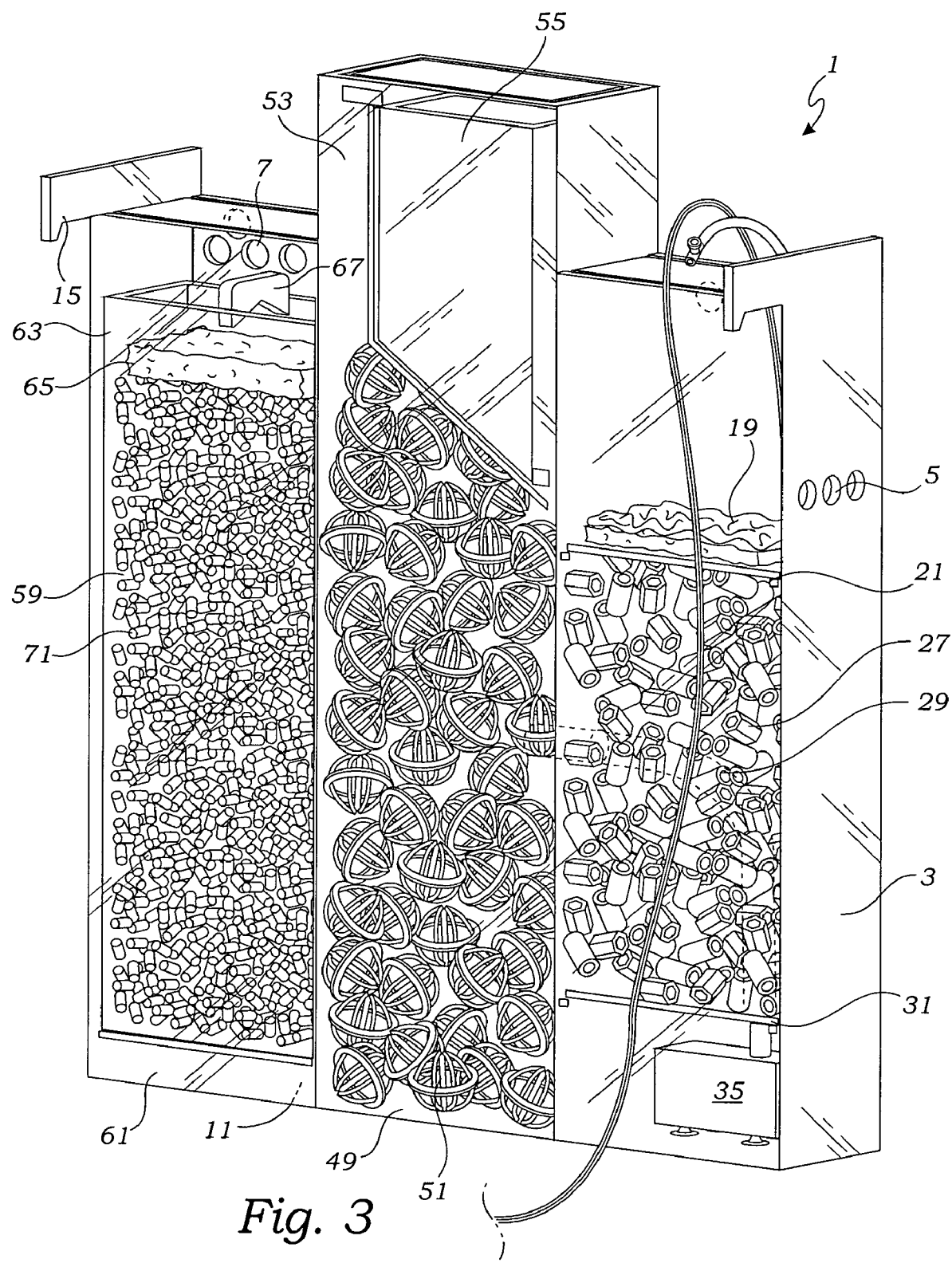
FIG. 3 is a perspective view illustrating an aquarium filtration system of the present invention including all filtration media.
Figure 4:
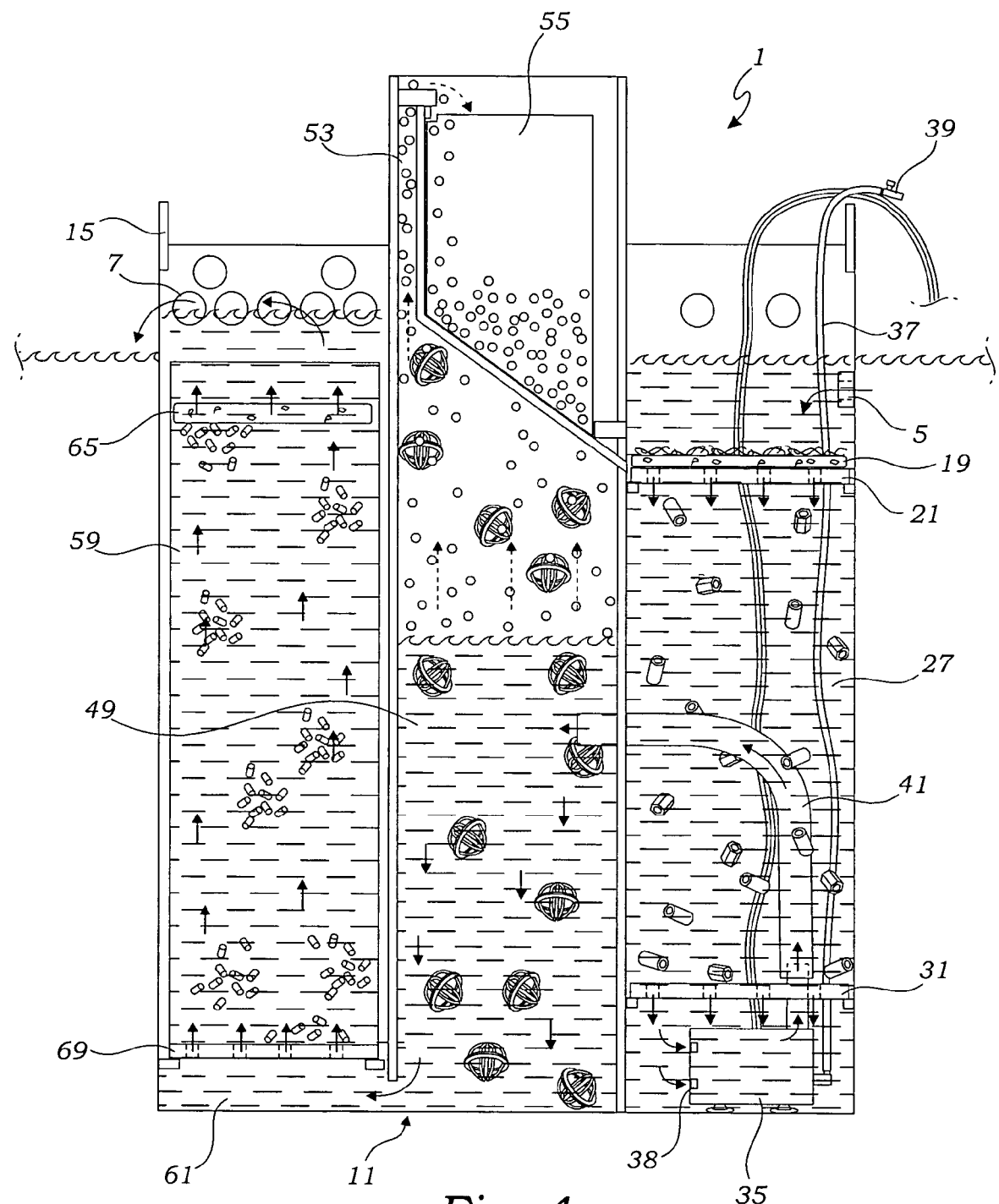
FIG. 4 is a side view and flowchart illustrating operation of the aquarium filtration system of the present invention.

In a preferred embodiment of the invention, the bio-reactor chamber 49 incorporates a protein skimmer. As best illustrated in FIGS. 3 and 4, the bio-reactor chamber incorporates a vertical column 53 which projects upwardly above the waterline. In addition, the protein skimmer includes a removable protein collector 55 which collects unwanted proteins for removal from the aquarium environment. In operation, the controlled introduction of air into the bio-reactor chamber causes air bubbles to be created below the waterline within the chamber. Proteins are caused to form upon the bubbles which are forced upwardly through the vertical column 53 until they are collected within the protein collector 55. Once full of proteins, the collector can be removed for simple disposal of unwanted proteins.

In addition to a bio-reactor chamber 49 and protein skimmer, the aquarium filtration system preferably includes additional filtration subsystems. In a preferred embodiment, the aquarium filtration system 1 includes a physical filtration pad 19 substantially adjacent to the housing's inlet 5. The physical filter pad is preferably constructed of synthetic resin fibers for trapping unwanted larger debris and waste materials. The filter pad 19 preferably rests upon a filter pad support 21 which includes a plurality of holes for allowing water to pass through the holes into additional filtration chambers. As shown in the figures, preferably the aquarium filtration system includes an anaerobic filter chamber immediately downstream from the filter pad. The anaerobic filter chamber includes filter materials which rest upon a support platform 31. The anaerobic filter materials can be selected by those skilled in the art. However, a preferred anaerobic filter material consists of ceramic cylindrical nodules.

In addition to the bio-reactor chamber, protein skimmer and anaerobic filter chamber, preferably the aquarium filtration system also includes a chemical adsorption chamber 59. As shown in the figures, a preferred chemical adsorption chamber is positioned immediately downstream from the bio-reactor chamber. A conduit 61 is provided which transports water which has passed through the bio-reactor chamber 49 into the chemical adsorption chamber 59. In a preferred embodiment, the chemical adsorption chamber includes a removable casing 63 for encasing a filtration media. The casing includes a plurality of holes 69 for allowing water to pass through the casing's bottom into the filtration media. Preferably, the casing 63 also includes a handle 67 for assisting a person to remove the casing from the filtration system housing 3. Moreover, preferably an additional filter pad 65 is provided immediately above the chemical adsorption filter media. Again, the filter media may be selected by those skilled in the art. However, preferably the chemical adsorption media consists of readily available activated charcoal.

With reference to FIG. 4, in operation, the aquarium filtration system is substantially submerged within the water within an aquarium. Water enters into the housing 3 through an inlet 5. As a result of the pumping action produced by the pump 35 positioned at the bottom of the housing, water passes through the filter pad 19 and filter support 21 into the anaerobic filter chamber 27. The aquarium water is filtered through the ceramic nodules 29 until it passes through the holes formed in the support platform 31. The water is then received within the pump's water inlet 38. Within the venturi pump, the water is mixed with air received through the pump hose 37 and the combination of water and air is pumped through the tube 41 into the bio-reactor chamber 49.

The bio-reactor chamber 49 includes numerous bio-balls which utilizes bacteria and super oxygen saturated water to provide aerobic biological filtration. Air introduced into the bio-reactor chamber forms foam above the waterline which is forced upwardly through the vertical column 53. The foam carries dissolved protein compounds which are then collected within the removable protein skimmer 55.

After passing through the bio-reactor, the partially filtered water passes through a conduit 61 into the chemical adsorption chamber 59. Organic toxic compounds are bound to the activated carbon 71 which results in filtered water being forced through the housing's outlet 7 back into the aquarium environment.

While several particular forms of the invention have been illustrated and described, it will be apparent that various modifications can be made without departing from the spirit and scope of the invention. Accordingly, it is not intended that the invention be limited except by the following claims.

I claim:

1. An aquarium filtration system comprising;
    a housing including a bottom and one or more walls for holding water, said housing further including an inlet for receiving prefiltered water from an aquarium and an outlet for returning filtered water to an aquarium;
    a bio-reactor chamber within said housing, said bio-reactor chamber constructed to have a waterline below which water is to be positioned, wherein said bio-reactor chamber includes a substantially vertical column and a foam collection container within said bio-reactor chamber, said vertical column and said foam collection container for collecting proteins;
    a plurality of bio-balls located within said chamber to form a bio-ball chamber; and
    a pump means for pumping water through said inlet and said outlet of said housing including through said chamber, said pump means also pumping air from outside said housing into said bio-reactor chamber storing said bio-balls, said pump means pumping air into said bio-reactor chamber below the waterline and below the top of the bio-balls to produce oxygenated water.

2. The aquarium filtration system of claim 1 wherein said pump means includes a single pump for pumping water through said housing including through said chamber and for pumping air from outside said housing into said chamber storing said bio-balls.

3. The aquarium filtration system of claim 1 further comprising a fixture for affixing said housing to the sides of an aquarium.

4. An aquarium filtration system comprising;
    a housing including a bottom and one or more walls for holding water, said housing further including an inlet for receiving prefiltered water from an aquarium and an outlet for returning filtered water to an aquarium;
    a fixture for affixing said housing to the sides of an aquarium;
    at least three chambers within said housing;
    a first of said chambers being a bio-reactor chamber and protein skimmer combination including a plurality of bio-balls, a substantially vertical column and a foam collection container located within said chamber, said vertical column and said foam collection container for collecting proteins, said bio-reactor chamber constructed to have a waterline below which water is to be positioned;
    a second of said chambers including a filtration medium provided aerobic degradation;
    a third of said chambers a filtration material for chemical desorption; and
    a pump means for pumping water through said inlet and said outlet of said housing including through said chamber, said pump means also pumping air from outside said housing into said bio-reactor chamber below the waterline and below the top of the bio-balls to produce oxygenated water.

* * * * *